United States Patent Office 3,462,652
Patented Aug. 19, 1969

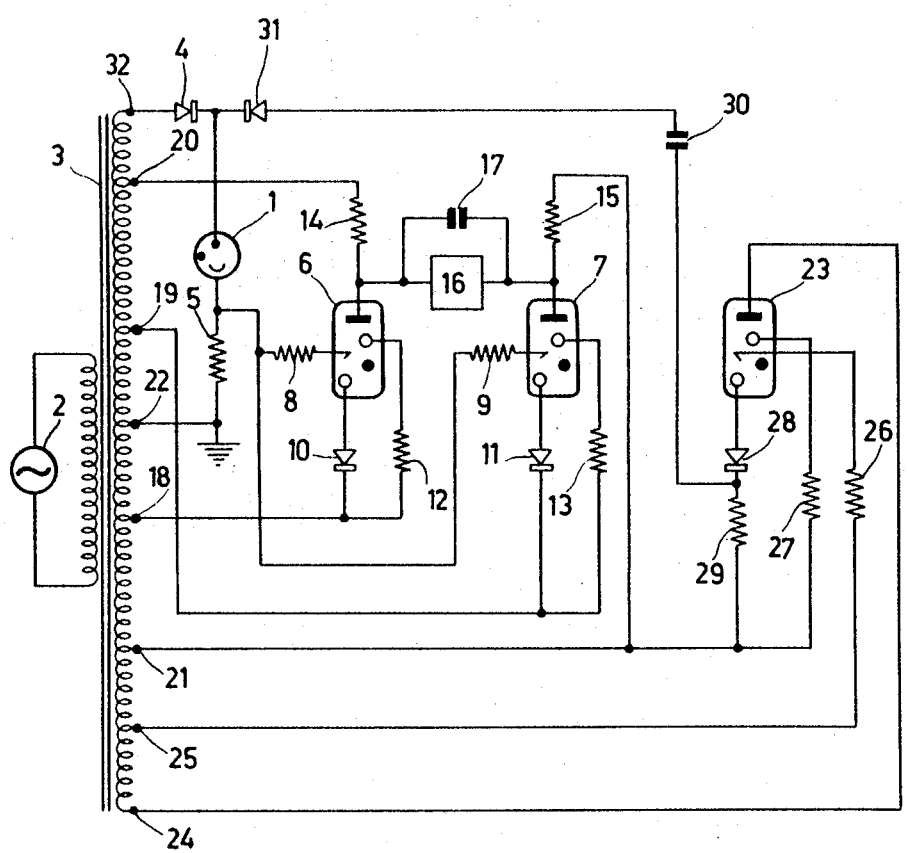

3,462,652
RADIATION-RESPONSIVE CIRCUIT ARRANGEMENT
Peter Southcott Smith, London, England, assignor, by mesne assignments, to U.S. Philips Corporation, New York, N.Y., a corporation of Delaware
Filed June 24, 1965, Ser. No. 466,749
Claims priority, application Great Britain, July 1, 1964, 27,181/64
Int. Cl. H01h 47/24
U.S. Cl. 317—124    17 Claims

ABSTRACT OF THE DISCLOSURE

A flame monitor system that includes a gas photocell on which photons are incident at given time intervals. A control signal is periodically derived from the photocell during time intervals that are longer than said given time intervals. In order to test the photocell, the current therein is periodically sampled during different time intervals to derive a test signal that is related to the mean value of the sampled current occurring over a plurality of sampling periods. The sampling time intervals are shorter than said given time intervals.

---

This invention relates to radiation-responsive circuit arrangements and particularly, but not exclusively, to monitoring arrangements adapted for the control and protection of fuel firing installations such as oil-fired furnaces.

One circuit of this kind functions by monitoring the flame produced by the burning fuel. For this purpose a radiation-sensitive element, e.g. ultra-violet or infra-red sensitive, is exposed to the flame and is connected in the circuit so as to operate suitable alarm or like protective means. Such means may comprise a relay which is energized when the flame is present and deenergized when the flame is absent for any reason. An arrangement of this kind is fail safe if the power supply to the relay fails since deenergization of the relay corresponds to a flame fault condition.

The radiation-sensitive element may be, for example, a photo-emissive cell. If a voltage is applied across one of these cells, the current through it may be made to depend upon the radiation incident upon it. The increase and decrease in current through the element that is obtained with varying levels of irradiation may be made to operate, in known manner, the aforesaid protective means.

It will be seen that it is important that a fault developing in the circuit should not result in a loss of protection, i.e. it is important that the circuit should fail safe under as many fault conditions as possible. If the circuit should not fail safe, great inconvenience may be caused, for example, by fuel oil flooding a furnace if the furnace flame should be extinguished without the control circuit causing the oil supply to be switched off.

The electrical conductivity of radiation-sensitive elements normally increases with an increase in intensity of the radiation incident upon them. Thus, if in the above case, the removal of incident radiation because of the flame going out does not cause the electrical conductivity to decrease sharply, there will be great danger of the circuit not failing safe. Unfortunately it is possible that certain faults may occur in the currently available radiation-sensitive elements, especially in photo-emissive elements, which faults may cause this situation to arise.

It is often found that dendrites grow on the cathode of photo-emissive elements, and become quite large after a period of time. They may in fact become large enough to cause a breakdown because the electric field occurring at their tips when the normal operating potential of the element is applied may be sufficient to cause the anode-cathode path of the element to become conducting, even without radiation being incident upon the cell. Thus, if this situation occurs, removal of incident radiation will not cause the resistance of the element to rise sufficiently to operate the protective means, i.e. the circuit containing the element will not fail safe. As pointed out above, this is a most undersirable situation.

Various methods have been put forward to provide a check on whether the aforesaid situation has occurred. These normally entail the provision of a mechanically operated opaque shutter placed between the source of radiation and the radiation-sensitive element. The shutter is normally in the open position, allowing radiation to be incident upon the element. However, it is periodically closed for a short time in order to cut off the radiation. A control circuit associated with the element is then made to operate protective means if the element behaves as if radiation is still incident upon it during the period of shutter closure. In this way a check is kept upon the fail safe properties of the element. Mechanical arrangements of this kind are naturally susceptible to mechanical faults, which is a disadvantage. For example, the shutter may get stuck in a closed or open position with a possible consequent loss of its checking function, or with a possible consequent unnecessary shut-down of the furnace.

It is an object of the invention to provide a control circuit which is capable of operating without mechanical shutters.

The invention provides a radiation-responsive circuit arrangement including a radiation-sensitive element responsive to individual photons. There is also provided means for deriving a working signal from said element that is related to the number of operative photons incident on said element over working periods of time that are greater than the statistically expected intervals between the incidence of successive operative photons on the device. Test means are provided for sampling the current through the element for test periods of time that are small compared with said statistically expected intervals, and including means for deriving a test signal from said element that is related to the mean value of said sampled current over a few test periods.

The radiation-sensitive element may be such that its electrical conductivity increases on the arrival of said operative photons and the arrangement may include control means for controlling an external apparatus. The working signal may then be arranged to cause the control means (which may be an electromagnetic relay) to be put into a first state when the operative photons are present and into a second state when said photons are absent.

The test signal may be arranged to cause the control means to be put into the second state if the sampled current is greater than a given value.

The first state may be the energized state and the second state may be the de-energized state of the control means. The electrical conductivity of the radiation-sensitive element may exhibit a time lag in going from a high to a low conductivity state. In this case the arrangement may include supply means for supplying a working operating voltage to the element and interrupter means for periodically interrupting, for test purposes, the working operating voltage without causing the control means to be put into the second state. The test means is arranged to supply a test operating voltage to the element during the interruptions after intervals from the start of the interruptions greater than the time lag and for the durations of the test periods.

The element may comprise a gas-filled photocell, for example, Mullard type 155UG.

The test signal may alternatively be used to operate a suitable alarm or like means for indicating that the circuit arrangement is no longer functioning correctly.

The invention will now be described, by way of example, with reference to the accompanying diagrammatic drawing which shows one embodiment thereof.

In the drawing, numeral 1 denotes a gas-filled photocell as the radiation-sensitive element responsive to individual photons. A working operating voltage is applied to said cell from a source 2 of alternating current via supply means comprising a tap 32 on a transformer 3, and a first rectifier 4. As there are no smoothing components associated with rectifier 4, the cell is supplied with raw half-wave rectified AC. The rectifier thus acts as the interrupter means and periodically interrupts the operating voltage on every second half-cycle of the applied working voltage. The cell is provided with a load resister 5 in series therewith for developing a half-wave rectified output working signal that is proportional to the radiation incident upon the cell over each alternate half-cycle. The half-cycle periods are arranged to be longer in duration than the statistically expected intervals between the incidence of successive operative photons on the device. The working signal is applied to the trigger electrodes of two cold-cathode gas-filled trigger tubes 6 and 7 via trigger series resistors 8 and 9, respectively.

Rectifiers 10 and 11 are included in the cathode circuits of the tubes 6 and 7, respectively, for assisting the extinguishing of the discharge in the tubes when their anode-cathode potentials change sign. The priming electrodes of the tubes 6 and 7 are supplied through priming resistors 12 and 13, respectively, and the tube anodes are supplied with alternating current in relatively reverse senses from the transformer through substantially equal load resistors 14 and 15, respectively. A relay 16 is provided for controlling an external apparatus (which may be a fuel firing installation). The relay is shunted by a capacitor 17 which forms a parallel combination therewith having a time constant that is long relative to that of the alternating current supply.

Neglecting the rest of the arrangement for the moment, the part of the arrangement already described operates as follows:

The tubes 6 and 7 act in conjunction with the load resistors 14 and 15 in a manner similar to a differential amplifier for unidirectional voltages applied to their triggers. The current for the amplifier is supplied from the transformer 3 and the output of the amplifier is taken from the anode ends of the two load resistors.

Suppose that there is no fault in the photocell. Under conditions of no illumination, the cathode of the cell, and hence the trigger electrodes of tubes 6 and 7, will be at all times at ground potential. Thus a low alternating potential governed by the position of taps 18 and 19 will be applied between the trigger electrodes and the cathodes of tubes 6 and 7. This potential is arranged to be too small to trigger the tubes 6 and 7, which thus remain non-conducting. The average potentials at each of the two tube anodes over a few cycles will thus be substantially equal to ground potential (assuming symmetry of taps 18 and 19, and 20 and 21 about the grounded tap 22). Thus the average potential across relay 16 will be substantially zero. The capacitor 17 is made large enough in value to ensure that substantially only this average potential is effective. Consequently, the relay remains unenergized.

Under conditions of illumination (again assuming no fault in the photocell) the photocell cathode is carried positive with respect to ground on every second half-cycle of the supply because of conduction in the cell when the voltage applied to rectifier 4 is of the correct sign. This cathode potential is applied to the trigger electrodes of tubes 6 and 7. It will be seen that during these conducting half-cycles the anode of tube 6 is positive with respect to its cathode, and that of tube 7 negative. Thus the tube 6 is triggered on the conducting half-cycles because of its positive trigger potential, whereas the tube 7 remains untriggered because of its negative anode potential. On the other hand, both tubes remain untriggered on the other half-cycles in the same way as described above for conditions of no illumination because of their zero trigger potentials with respect to ground. Thus the average potential of the anode of tube 6 becomes negative with respect to ground while that of tube 7 is still substantially equal to ground potential. This difference is utilised to energize the relay into a first operating state.

A disadvantage with this part of the circuit arrangement as it stands is that a short circuit or like fault in the photocell will cause energisation of the relay. The remainder of the arrangement is included to render this possibility unlikely.

The remainder of the arrangement comprises test means including a voltage-threshold-responsive device, in this case a trigger tube 23 whose anode is supplied from tap 24 on the transformer. The trigger electrode is energized from tap 25 via trigger series resistor 26, and the priming electrode and cathode from tap 21 via priming resistor 27 and by rectifier 28 and cathode load resistor 29, respectively. Rectifier 28 serves the same purpose as rectifiers 10 and 11. The voltage developed at the cathode end of the cathode resistor 29 is applied as a test voltage to the anode of the photocell by way of the series combination of capacitor 30 and rectifier 31.

This part of the circuit arrangement operates as follows:

On the alternate half-cycles of the source 2, when the top end of the transformer in the diagram is positive with respect to the bottom end, i.e. when the photocell conducts if it is illuminated or possibly if it is faulty, the anode of tube 23 is negative with respect to its cathode. The tube therefore remains non-conducting and the first part of the circuit operates as described above. On the other half-cycles the anode and trigger electrodes of tube 23 swing positive with respect to the cathode and the tube fires into the conducting state after sufficient time has elapsed to allow this swing to progress sufficiently far.

This time is arranged to be longer than the quenching time of cell 1 (i.e. the time the cell takes to go from a high to a low conductivity state). As soon as the tube conducts, the cathode end of resistor 29 goes positive with respect to tap 21 and a positive-going pulse from this resistor is applied as a test operating voltage to the photocell anode via capacitor 30 and rectifier 31. The capacitance of capacitor 30 is made small enough so that this pulse is short in duration compared with the statistically expected interval between the arrival of successive operative photons of the radiation, which may at this time be incident upon the photocell. By "operative photons" is meant those photons which are likely to result in the emission of a photo-electron from the cathode of the cell 1. It may be necessary to place an almost opaque filter in the radiation path in order to make the interval between successive operative photons manageably long.

As the test voltage is so short in duration the photocell is unlikely to conduct during its application unless the cell is faulty. This means that if the cell current is persistently greater than zero during this sampling of its current by the application of the test voltage, it is almost certainly faulty and it is desired that the relay should drop out into its second operating state, thus removing any danger to the external apparatus. It will be seen below that this fail-safe property is inherent in the complete arrangement.

If the cell is faulty and hence conducts during the application of the test voltage, it will be conducting on every half-cycle of the supply 2. Thus tube 6 is triggered on alternate half-cycles and tube 7 is now also triggered by the test signals on the other (test) half-cycles. A signal is derived at the anode of tube 7 which varies with the current passed by the cell during these half-cycles. Over a number of cycles the effect is that the anodes of tubes 6 and 7 operate with average voltages which are substantially identical to each other. Thus there is substantially no voltage existent across relay 16 (because of the presence of capacitor 17). Thus the relay is deenergized, as required.

Suitable component values for the circuit shown in the diagram are:

Source 2—240 volts 50 c./s. A.C.
Transformer 3 secondary taps 32, 20, 19, 22, 18, 21, 25, 24—220 v., 140 v., 70 v., 0 v., 70 v., 140 v., 280 v., 380 v., respectively.
Rectifiers 4, 10, 11, 28, 31—Mullard type OA210.
Photo-cell 1—Mullard type 155UG.
Trigger tubes 6, 7, 23—Mullard type Z700U.
Resistor 5—$68 \times 10^3$ ohm.
Resistors 8, 9, 26—$5.6 \times 10^3$ ohm.
Resistors 12, 13, 27—$18 \times 10^6$ ohm.
Resistors 14, 15—$15 \times 10^3$ ohm.
Resistor 29—$47 \times 10^3$ ohm.
Capacitor 17—2 $\mu$f.
Capacitor 30—500 pf.
Relay 16—Post Office type 3000 ($25 \times 10^3$ ohm resistance).

With suitable changes in component values the transformer 3 may be simplified, e.g. by amalgamating taps 18, 19 and 22 and by amalgamating taps 20 and 32.

The trigger tubes 6, 7 and 23 may also be replaced, e.g. by thyristors.

What I claim is:

1. A radiation-responsive circuit comprising, a radiation-sensitive element responsive to individual photons incident thereon at given time intervals, means for deriving an electric signal from said element that is related to the number of photons incident on said element during a work period of time that is greater than the given intervals between the incidence of successive photons on the element, test means for periodically sampling the current through the element during test periods of time that are small compared with said given time intervals and including means for deriving a test signal from said element that is related to the mean value of said sampled current occurring over a plurality of sampling test periods.

2. A circuit as claimed in claim 1 wherein said radiation-sensitive element comprises an element that exhibits an increase in its electrical conductivity upon incidence of said photons, control means for controlling an external apparatus, and means coupling said electric signal to the input of said control means to drive said control means into a first state when said photons are present and into a second state when said photons are absent.

3. A circuit as claimed in claim 2 further comprising means coupling said test signal to the input of said control means to control the state of said control means so as to drive same into said second state if said sampled current is greater than a given threshold value.

4. A circuit as claimed in claim 3 wherein said first state is the energized state of said control means and said second state is the deenergized state of said control means.

5. A circuit as claimed in claim 4 wherein said control means includes an electromagnetic relay.

6. A circuit as claimed in claim 2 wherein the electrical conductivity of said radiation-sensitive element exhibits a time lag in going from a high conductivity state to a low conductivity state, said circuit including supply means for supplying an operating voltage to said element, interrupter means for periodically interrupting said operating voltage for a predetermined time interval, said test means including means for supplying a test operating voltage to said element during said predetermined time interval with a time delay that is greater than said element time lag.

7. A circuit as claimed in claim 6 wherein said element comprises a gas-filled photocell.

8. A circuit as claimed in claim 6 wherein said supply means comprises a source of alternating current and said interruptor means comprises a first rectifier connected in series with said supply means and said element, said test means including a device having a threshold voltage and coupled to said supply means so as to conduct current during the half-cycles of the AC supply when said rectifier is reverse biased, means coupling the output of said threshold device to said element to supply said test operating voltage thereto, said coupling means comprising the series combination of a second rectifier and a capacitor having a capacitance which is chosen to limit the time duration of said coupled test operating voltage to a time interval that does not exceed said predetermined time interval.

9. A circuit as claimed in claim 8 wherein said supply means comprises a transformer to which said element is coupled and wherein said threshold device comprises a first trigger tube coupled to said transformer in reverse sense to that of said element, a first load resistance connected in series with the cathode of said trigger tube, and means connecting the cathode end of said resistance to said series combination.

10. A circuit as claimed in claim 9 wherein said control means further comprises second and third trigger tubes symmetrically coupled to said transformer with reverse polarities, second and third load resistors connected in series with said second and third tubes, respectively, an output device and a smoothing capacitor connected in parallel between the tube ends of said second and third load resistors, said parallel combination having a time constant that is long relative to the period of said alternating current, a fourth load resistor connected in series with said radiation sensitive element, and means coupling the trigger electrodes of said second and third tubes to the element side of said fourth load resistor.

11. A monitoring system comprising, a radiation-sensitive element disposed to receive from the monitored apparatus radiant energy that is incident thereon at given spaced time intervals, means for periodically producing a control signal derived from said element and related to the incident radiant energy during first time intervals that are longer than said given time interval, means for periodically sampling the element current during second mutually exclusive time intervals that are shorter than said given time interval, means for deriving a test signal from said element that is determined by the current sampled during a plurality of said sampling periods, and an output device that is responsive to said control signal and to said test signal.

12. A system as claimed in claim 11 further comprising a source of operating voltage coupled to said radiation-sensitive element, means for periodically interrupting the supply of said operating voltage to said element during time periods that include said second time intervals, and means for supplying a test operating voltage to said element during said second time intervals, said test voltage being independent of said radiant energy.

13. A system as claimed in claim 11 further comprising a source of alternating current, a diode coupling said current source to said element so as to apply to said element alternate half-cycles of said alternating current that coincide with said first time intervals, and means coupled to said current source for applying a test voltage to said element during the other alternate half-cycles of said alternating current.

14. A system as claimed in claim 11 wherein said radiation-sensitive element exhibits a given response time to said radiant energy, said sampling means including means for applying a test voltage to said element subsequent to the end of said first time intervals and with a time delay that exceeds said element response time.

15. A system as claimed in claim 11 further comprising a source of alternating current, a transformer having a primary winding connected to said current source and a secondary winding, a diode coupling said secondary winding to said element, a trigger device having a given threshold voltage and coupled to said secondary winding in a reverse sense to that of said element, a load resistor in series with said trigger device for developing a test voltage, and means coupling said load resistor to said element.

16. A system as claimed in claim 15 wherein said coupling means comprises a second diode and a capacitor connected in series, said system further comprising a pair of trigger devices symmetrically coupled to said secondary winding in opposite sense, and means for coupling said output device between the output electrodes of said pair of trigger devices.

17. A system as claimed in claim 16 further comprising a second capacitor connected in parallel with said output device to provide a time constant for the parallel combination that is relatively long with respect to the period of said alternating current.

References Cited
UNITED STATES PATENTS

| | | | |
|---|---|---|---|
| 2,762,034 | 9/1956 | Joyce et al. | 340—228.2 |
| 2,807,008 | 9/1957 | Rowell | 340—213 |
| 2,811,711 | 10/1957 | Cade et al. | 340—228.2 |
| 2,911,540 | 11/1959 | Powers | 250—217 |
| 3,154,724 | 10/1964 | Giuffrida | 317—130 |

JOHN F. COUCH, Primary Examiner

R. V. LUPO, Assistant Examiner

U.S. Cl. X.R.

317—130; 340—228